(12) United States Patent
RührnößL et al.

(10) Patent No.: US 12,220,766 B2
(45) Date of Patent: Feb. 11, 2025

(54) METHOD FOR PRODUCING METAL STRUCTURES

(71) Applicant: Fronius International GmbH, Pettenbach (AT)

(72) Inventors: Manfred RührnößL, Linz (AT); Markus Schorn, Steinerkirchen (AT); Herbert Staufer, Neuhofen (AT)

(73) Assignee: Fronius International GmbH, Pettenbach (AT)

( * ) Notice: Subject to any disclaimer, the term of this patent is extended or adjusted under 35 U.S.C. 154(b) by 885 days.

(21) Appl. No.: 17/277,509

(22) PCT Filed: Sep. 18, 2019

(86) PCT No.: PCT/EP2019/074927
§ 371 (c)(1),
(2) Date: Mar. 18, 2021

(87) PCT Pub. No.: WO2020/058298
PCT Pub. Date: Mar. 26, 2020

(65) Prior Publication Data
US 2021/0370442 A1 Dec. 2, 2021

(30) Foreign Application Priority Data
Sep. 20, 2018 (EP) .................................. 18195766

(51) Int. Cl.
*B23K 26/342* (2014.01)
*B33Y 10/00* (2015.01)
*B33Y 30/00* (2015.01)

(52) U.S. Cl.
CPC ............ *B23K 26/342* (2015.10); *B33Y 10/00* (2014.12); *B33Y 30/00* (2014.12)

(58) Field of Classification Search
CPC .............. B23K 26/342; B23K 2103/04; B23K 26/1423; B23K 9/1675; B23K 9/1735; B23K 26/348; B33Y 10/00; B33Y 30/00
(Continued)

(56) References Cited

U.S. PATENT DOCUMENTS

| 6,207,929 B1* | 3/2001 | Stava ..................... B23K 9/092 |
| | | 219/130.51 |
| 9,579,742 B2* | 2/2017 | O'Donnell ........... B23K 9/1735 |

(Continued)

FOREIGN PATENT DOCUMENTS

| AT | 515465 | 9/2015 |
| WO | 97/45227 | 12/1997 |
| WO | 2006/133034 | 12/2006 |

OTHER PUBLICATIONS

Horrii, T. Kirihara, S., "Freeform fabrication method of alloys and intermetallic compounds by 3D Micro Welding", Transactions of JWRI, vol. 37 (2008), No. 2 (Year: 2008).*
(Continued)

*Primary Examiner* — Dana Ross
*Assistant Examiner* — James F Sims, III
(74) *Attorney, Agent, or Firm* — GREENBLUM & BERNSTEIN, P.L.C.

(57) ABSTRACT

In order to provide an improved method for producing metal structures which allows a high level of flexibility in respect of process speed of production, material composition of the metal structure, production accuracy, and the quality of the produced metal structure, according to the invention, a second metal additive is supplied to a welding point on a metal base material, which second metal additive is fused at least by a second electric arc produced between a second electrode and the metal base material in order to produce a second weld seam at the welding point, wherein different materials are used as the first metal additive and as the (Continued)

second metal additive, and wherein the first metal additive and the second metal additive are supplied to the welding point sequentially in time and are fused in the region of the welding point in whichever of the first and second electric arcs is burning, in order to form the three-dimensional metal structure.

22 Claims, 3 Drawing Sheets

(58) Field of Classification Search
USPC .................................................. 219/121.66
See application file for complete search history.

(56) References Cited

U.S. PATENT DOCUMENTS

| | | | | |
|---|---|---|---|---|
| 10,073,434 | B1* | 9/2018 | Hollander | .............. G05B 19/19 |
| 10,421,142 | B2* | 9/2019 | Stempfer | .............. B22F 10/362 |
| 2011/0132878 | A1 | 6/2011 | Wang et al. | |
| 2012/0006795 | A1* | 1/2012 | Nowak | .............. B23K 26/0604 |
| | | | | 219/121.64 |
| 2014/0263228 | A1* | 9/2014 | Peters | .................... B23K 9/093 |
| | | | | 219/130.1 |
| 2018/0178304 | A1* | 6/2018 | Pucek | .................... B23K 9/044 |
| 2018/0250876 | A1* | 9/2018 | Michel | .................... B33Y 30/00 |
| 2018/0369966 | A1* | 12/2018 | Hansen | ................ B23K 26/348 |

OTHER PUBLICATIONS

Europe Search Report conducted in counterpart Europe Appln. No. 18195766.3 (Mar. 15, 2019).

Internation Search Report (Form PCT/ISA/210) conducted in Int'l Appln. No. PCT/EP2019/074927 (Nov. 25, 2019) (w/ English translation thereof).

Internation Written Opinion (Form PCT/ISA/237) conducted in Int'l Appln. No. PCT/EP2019/074927 (Nov. 25, 2019) (w/ English translation thereof).

* cited by examiner

METHOD FOR PRODUCING METAL STRUCTURES

The invention relates to a method for the automated production of three-dimensional metal structures on a metal base material, wherein a first metal additive is supplied to a welding point on a metal base material, which first metal additive is fused at the welding point in order to produce a first weld seam at least by means of a first electric arc produced between a first electrode and the metal base material, and wherein a laser beam is supplied to the welding point. The invention further relates to a welding arrangement with optics, having a first welding torch with a first electrode, having a first supply device for supplying the first metal additive to a welding point and having at least one control unit for controlling the welding arrangement, and a use of the welding arrangement for producing three-dimensional metal structures on a metal base material.

There are currently a number of common welding methods in the prior art. For example, gas-shielded metal arc welding (GSMAW) processes have been known for many years. These include, for example, the metal inert gas (MIG) welding method or the metal active gas (MAG) welding method, in which a melting electrode made of a metal electrode material is surrounded by a so-called shielding gas. Gas-shielded metal welding processes are usually used either to apply a weld seam to a base material (cladding) or to join two base materials (joint welding). In both cases, an electric arc is ignited by means of an electric voltage or an electric current resulting therefrom between the electrode and the base material which fuses the electrode and the region of the base material surrounding the electrode, creating a material bond. The same or a similar material as for the base material is usually used as the electrode material. The electrode is supplied to the welding point at a specific electrode feed speed, whereby the electrode feed speed can be fixed, e.g. in manual welding by hand or can also be dependent on other parameters, for example on a welding speed at which the electrode is moved relative to the base material or depending on the current, etc.

The shielding gas is used to shield the electric arc and the region of the melt from the atmosphere, substantially to avoid oxidation. Either an inert gas (MIG) or an active gas (MAG) is used as the shielding gas. Inert gases, for example helium (He) or argon (Ar), are gases that do not enter into any chemical reactions with the melt. The MIG method is mainly used for non-ferrous metals and high-alloy steels. Active gases such as carbon dioxide ($CO_2$) or oxygen (O) are reactive gases that are used to consciously change the composition of the melt. They are preferred for unalloyed and low-alloy steels.

Another welding process is what is known as tungsten inert gas (TIG) welding. In contrast to the GSMAW methods mentioned above, the TIG welding method uses a tungsten electrode with a very high melting point so that the electrode does not fuse during welding. The welding filler is accordingly supplied separately to the welding point in the form of a welding wire. The filler metal is fused in the electric arc burning between the tungsten electrode and the base material. Inert shielding gases analogous to those used in the MIG method are used as shielding gases.

There is also what is known as laser welding, which is used both for cladding and for joint welding. A laser beam is supplied to a workpiece by means of powerful optics, which laser beam locally fuses the workpiece by applying heat. Similar to the TIG method, an additive, for example in the form of a welding wire, is supplied to the welding point in laser cladding.

Another welding method is so-called laser hybrid welding, in which the GSMAW method and the laser welding process are combined. The laser serves to support the electric arc of the GSMAW process, i.e. to increase the heat input into the workpiece and/or the filler material.

In the past, welding was mostly done by hand. Today, thanks to the automation technology available, welding robots are often used, with which weld seams can be produced quickly and precisely. As a result, it is not only possible to weld individual weld seams onto a workpiece, but also, analogous to 3D printing, entire three-dimensional structures can be created by applying individual weld seams in layers. This can of course also be done manually, but for the highest possible accuracy it is preferably done under computer control. Such processes are also called additive manufacturing (AM) or wire arc additive manufacturing (WAAM).

With the methods known in the prior art, however, there is a limitation with regard to the welding speed, precision of the guidance of the electric arc, and with regard to the flexibility in the choice of material for the filler metal. This is disadvantageous because it limits the efficiency and thus the efficiency of the welding process. Likewise, complex geometries can also require different welding process settings, for example in order to be able to produce thin structures with little material and thick structures with a lot of material. This, too, is difficult or impossible to achieve with known methods.

AT 515465 A1 shows, for example, a method for generating three-dimensional structures by means of laser radiation. A plurality of wires are supplied to a welding point and fused by a laser beam to create the three-dimensional structure. Depending on the desired size of the three-dimensional structure to be generated, the number of wires can be varied and the focus of the laser beam can be adapted accordingly to the variable number of wires. One disadvantage is the relatively low deposition rate compared to conventional MIG/MAG welding, which means that the production of large-volume structures in particular is time-consuming and therefore cost-intensive.

The document WO 97/45227 A1 shows the applicant's known tandem GSMAW method, in which a plurality of welding wires running parallel to one another are supplied to a common welding torch. This allows the deposition rate to be increased compared to conventional GSMAW methods with a welding wire. However, due to the substantially fixed distances between the welding wires, the disadvantage is the poor fidelity in the creation of three-dimensional structures and the lack of dimensional accuracy since the electric arc is subject to certain scatter and therefore cannot be precisely positioned.

It is therefore the object of the invention to provide an improved method for producing metal structures which allows a high level of flexibility in terms of the process speed of production, material composition of the metal structure, production accuracy, geometry, and quality of the structure produced.

According to the invention, the object is achieved in that a second metal additive is supplied to the welding point on a metal base material, which second metal additive is fused at least by means of a second electric arc produced between a second electrode and the metal base material in order to produce a second weld seam at the welding point, wherein different materials are used as the first metal additive and as the second metal additive, and wherein the first metal additive and the second metal additive are supplied to the welding point sequentially in time and are fused in the region of the welding point in whichever of the first and second electric arcs is burning, in order to form the three-dimensional metal structure. Sequential welding with two different metal additives means that a three-dimensional metal structure can be constructed very flexibly in layers from two different materials. Additional heat input can be achieved through the laser support.

Advantageously, welding wires of the same or different dimensions are used as first metal additive and as second metal additive, preferably welding wires with a round cross section and a diameter between 0.1 and 5 millimeters, in particular between 0.8 and 2 mm. The method can be simplified and standardized by using conventional welding consumables.

The first metal additive can be is supplied to the welding point at a predetermined first wire feed speed and/or the second metal additive can be supplied at a predetermined second wire feed speed to the welding point, in which the first wire feed speed and the second wire feed speed can be set the same or different between 2 m/min and 25 m/min. As a result, the respective wire feed speed can be flexibly adapted to the specified boundary conditions, in particular to the geometry and material composition of the metal structure to be generated.

The first metal additive, the second metal additive, and the laser beam are preferably moved together relative to the base material and/or the base material is moved relative to the first metal additive, second metal additive, and laser beam, and/or at least the first metal additive or the second metal additive is moved relative to the laser beam, or the laser beam is moved relative to at least the first metal additive or the second metal additive. As a result, the sequence of movements for generating three-dimensional metal structures can be flexibly defined and the method can be better adapted to the required accuracy requirements, which is advantageous in the case of complex three-dimensional geometries of the metal structure. For example, stationary welding torches and a stationary optics could be used and only the metal base material could be moved spatially or vice versa or both at the same time.

It is advantageous if the first wire feed speed is selected during the movement of the first metal additive relative to the base material depending on a first welding speed of the first metal additive relative to the base material and/or the second wire feed speed is selected during the movement of the second metal additive relative to the base material depending on a second welding speed of the second metal additive relative to the base material. In this way, for example, a substantially constant cross section of the weld seam can be achieved over the entire length of the weld seam, or a change in cross section can deliberately be achieved over the length of the weld seam.

Advantageously, heat is supplied to the metal structure by means of the laser beam in order to change the structure of the metal structure, preferably to avoid joint errors between the first and second weld seam and/or for tempering and/or hardening a surface of the first and/or second weld seam or the metal structure or the laser beam is used to guide the first or second electric arc. Through this flexible application of the laser beam, for example, surface hardening of specific predetermined regions of the metal structure can be produced in a targeted manner already during the production process of the metal structure. As a result, a separate subsequent hardening process can be dispensed with, which saves time and money. When an electric arc is guided, the respective electric arc is substantially attracted by the laser beam, which results in a very precise welding process and thus a high degree of dimensional accuracy of the metal structure produced.

The laser beam can also be used for laser welding, at least the first or the second metal additive being fused only by the laser beam at the welding point. The laser beam can also be used for laser hybrid welding, at least the first or the second metal additive being fused by the laser beam and the first or second electric arc at the welding point. As a result, known methods are combined or can be used independently of one another, which means that it is possible to react very flexibly to various required boundary conditions.

It is advantageous if the first metal additive forms the first electrode and is fused at the welding point and/or the second metal additive forms the second electrode and is fused at the welding point, or if a non-consumable first electrode, preferably a first tungsten electrode, is provided as the first electrode, the first metal additive being supplied to the welding point, preferably by means of a first supply unit, and being fused at the welding point and/or if a non-melting second electrode, preferably a second tungsten electrode, is provided as the second electrode, the second metal additive being supplied to the welding point, preferably by means of a second supply unit, and being fused at the welding point. As a result, the known GSMAW method or the known TIG welding method can be used to weld the first and/or the second weld seam.

The object is also achieved with a welding arrangement of the type mentioned above, wherein at least one second welding torch with a first electrode for generating a first electric arc between the first electrode and the base material is arranged in the welding arrangement in order to fuse a first metal additive in order to produce a first weld seam on the base material and a second supply device is provided in order to supply the second metal additive to the welding point, different materials being provided as the first metal additive and the second metal additive, and in that the control unit is provided for controlling the first and second supply device, in order to supply the first metal additive and the second metal additive to the welding point sequentially in time, the first and the second welding torch being designed as separate units or as a double welding torch.

In the following, the present invention shall be described in greater detail with reference to FIGS. 1 to 3, which show schematic and non-limiting advantageous embodiments of the invention, in which.

Figure 1:
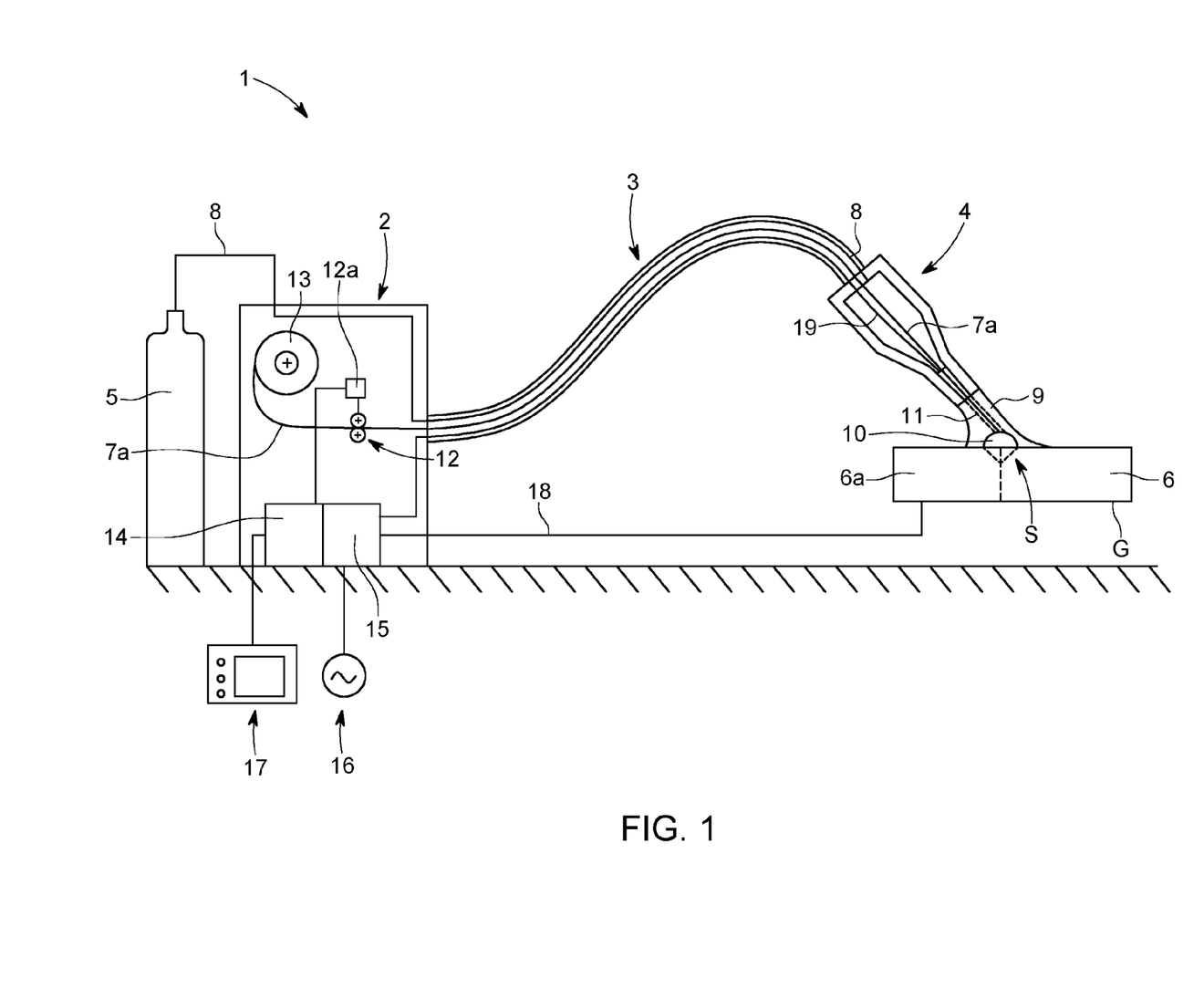
FIG. 1 shows a schematic structure of an GSMAW device.

FIG. 1 shows the basic structure of a gas-shielded metal arc welding (GSMAW) device 1. The welding device 1 has a welding power source 2, a hose package 3, a welding torch 4, and a shielding gas container 5 having a shielding gas SG. The shielding gas container 5 is connected to the welding torch 4 by means of a shielding gas line 8. In the shielding gas container 5 or in the shielding gas line 8, a pressure regulator (not shown), for example in the form of a known cylinder fitting, can be provided, which usually serves to regulate the flow of the shielding gas SG. In the welding power source 2, a welding electrode can be arranged in the form of a welding wire 7, which is usually wound onto a welding wire roll 13 or is conveyed from a drum. For unwinding the welding wire 7 and in particular for feeding the welding wire 7 to a welding point S, a supply unit 12 is arranged, which is driven by a feed drive unit 12a. The welding wire 7 on the welding wire reel 13 can, however, also be arranged outside the welding power source 2 in a unit which is separate from it. The feed drive unit 12a is controlled by a control unit 14, which in turn usually communicates with a user interface 17.

A user can specify specific welding parameters via the user interface 17, such as a welding power I, a wire feed speed vd, etc. For example, predefined welding programs with specific preset welding parameters can also be stored in the control unit 14, which can be selected by the user via the user interface 17. In the welding power source 2 there is also a power part 15 arranged which is regulated (and/or controlled) by the control unit 14 and which is connected to an external voltage supply 16. The power unit 15 supplies the welding torch 4 with the required welding power I via a power line 19 arranged in the hose package 3. In addition, the welding wire 7 (by means of the supply unit 12) and the shielding gas SG, and possibly also a cooling medium for cooling the welding torch 4, are usually supplied to the welding torch 4 via the hose package 3. Control lines can also be provided in the hose package 3. However, a number of individual lines for the respective media, control elements, and energy sources can also be provided as the hose package 3.

In order to carry out a welding process, a first electrical potential is applied to a workpiece 6 made of a base material G and a second electrical potential is applied to the welding wire 7a as a welding electrode via the power line 19, whereby, after an electric arc 11 is ignited between the welding wire 7 and the workpiece 6, a welding power I flows. By means of the electric arc 11, the welding wire 7 and a region of the base material G are fused, resulting in a material connection between the welding wire 7 and the base material G. In the example shown, a weld seam 10 is welded onto the workpiece 6, what is known as cladding. However, two workpieces 6, 6a could also be connected, as is symbolized by the dashed line; a so-called joint welding is used in this case. The electric arc 11 is surrounded by the shielding gas SG flowing out of the welding torch 4 in the form of a shielding gas bell 9 in order to shield the region of the molten material in the region of the weld seam 10 from the environment. It should be noted, however, that welding could in principle also be carried out without shielding gas SG. In this case, a shielding gas container 5 and a shielding gas line 8 could also be dispensed with. However, it should be ensured that, if possible, no oxygen is incorporated into the weld seam.

As mentioned above, depending on the material of the base material G, either low-reactive inert shielding gases SGi such as argon (Ar) or helium (He) or active shielding gases SGa such as oxygen (O) or carbon dioxide ($CO_2$) are used. The welding wire 7a is supplied to the welding point S at a specific wire feed speed vd, which can be dependent on several influencing variables. In manual welding, in which the welding torch 4 is guided by hand by one person, a constant wire feed speed vd is generally selected depending on the welding power I set, for example. In automated welding processes, for example when the welding torch 4 is guided by a robot, the wire feed speed vd can, for example, additionally be selected depending on a welding speed vs at which the welding torch 4 is moved relative to the workpiece 6. Of course, there can also be other influencing variables and welding parameters or other designs of the GSMAW device 1. The basically known principle remains the same, which is why no detailed description is given here.

Figure 2:
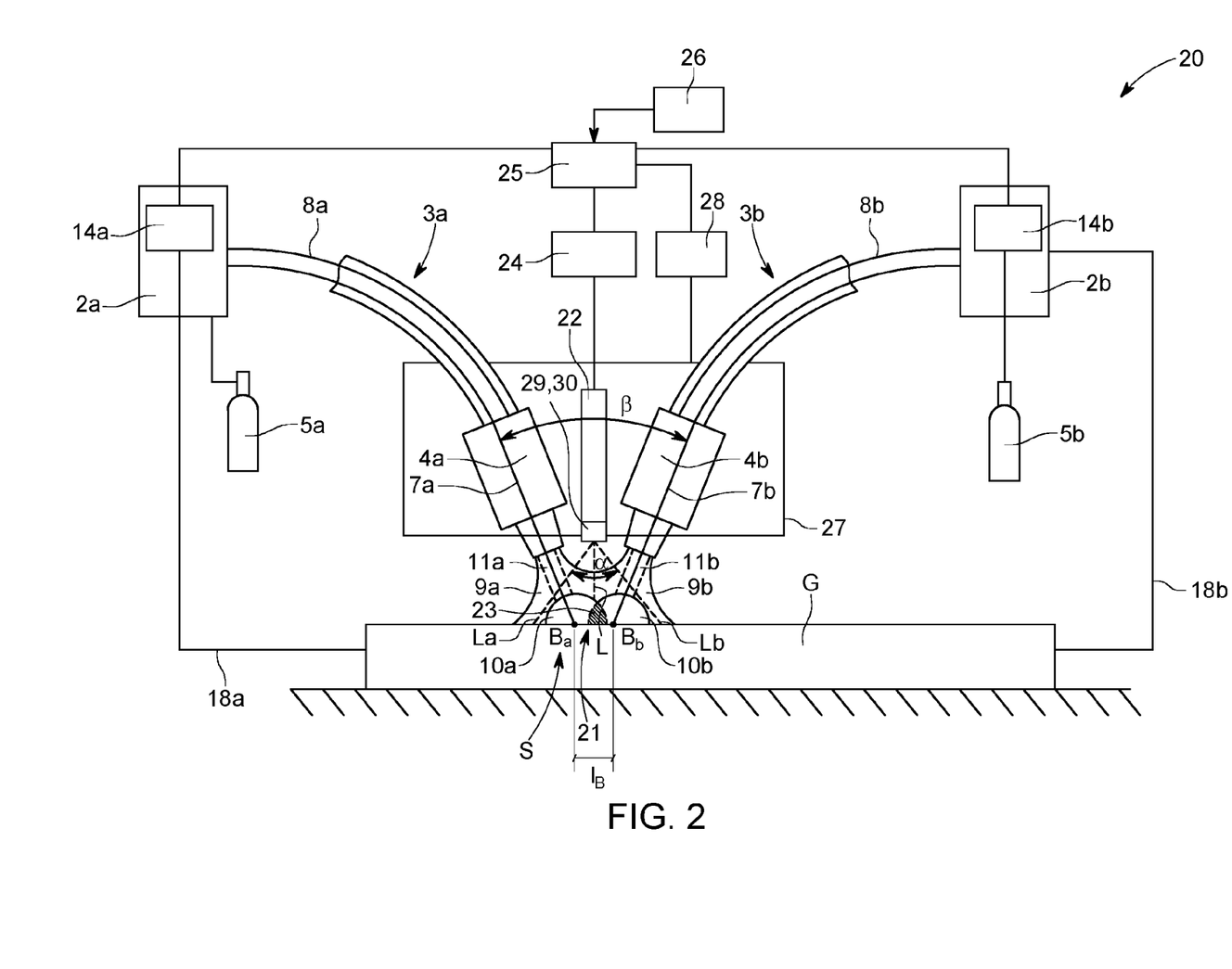
FIG. 2 shows a welding arrangement according to the invention.

The method according to the invention is described in more detail below with reference to FIG. 2. FIG. 2 shows a welding arrangement 20 with which preferably three-dimensional metal structures 21 can be welded onto a base material G. The three-dimensional metal structures 21 are composed of a plurality of individual weld seams 10i, which are welded in layers one above the other, as will be explained in detail later. The welding device 20 comprises at least a first and a second welding torch 4a, 4b, as well as optics 22, which are preferably arranged centrally between the two welding torches 4a, 4b. Of course, the optics 22 need not be arranged centrally, as shown in FIG. 2, but could also be arranged decentrally, for example on the outside. In the example shown, the two welding torches 4a, 4b are designed as conventional gas-shielded metal arc welding (GSMAW) torches, for example as explained with reference to FIG. 1, but could also be designed as a TIG welding torch with a non-fusing electrode. In the example shown, the first welding torch 4a is connected to a first welding power source 2a via a first hose package 3a and the second welding torch 4b is connected to a second welding power source 2b via a second hose package 3b. Of course, this is only an example; a common welding power source 2 could also be provided for both welding torches 4a, 4b. For each welding torch 4a, 4b, for example in the welding power sources 2a, 2b, a first and second metal additive ZSa, ZSb, are arranged, for example, in the form of wound welding wires 7a, 7b, which are conveyed to the welding point S by the associated supply units 12a, 12b. According to the invention, it is provided that different materials are used for the metal additives ZSa, ZSb, for example in the form of round welding wires 7a, 7b with the same or different diameters. Depending on the requirements placed on the metal structure 21 to be produced, different materials and differently dimensioned welding wires 7a, 7b can be combined. For example, two welding wires 7a, 7b made of different materials with, for example, different mechanical strength properties, but with the same or different diameters, could be used.

Furthermore, a shielding gas container 5a, 5b with a compressed shielding gas SGa, SGb is preferably provided for each welding torch 4a, 4b, which is generally supplied to the respective welding torch 4a, 4b via a shielding gas line 8a, 8b, in order to form, in each case, a shielding gas bell 9a, 9b around the molten metal in the region of the welding point S. When using an identical shielding gas SG for both shielding gases SGa, SGb, it would of course also be conceivable that only one common shielding gas container 5 is used. In the case of a basically conceivable simultaneous operation of both welding torches 4a, 4b, a common shielding gas bell 9 can also be formed, as indicated in FIG. 2. That substantially depends on whether the same or different shielding gases SGa, SGb are used and on the dimensions of the welding torches 4a, 4b and the arrangement of the welding torches 4a, 4b relative to the welding point S and relative to one another. Due to the different materials according to the invention of the two metal additives ZSa, ZSb, however, welding is generally not carried out with both welding torches 4a, 4b at the same time, because the desired material composition of the metal structure may not be achieved thereby. It should be noted, however, that welding could in principle also be carried out without shielding gas and therefore no shielding gas containers 5a, 5b and shielding gas lines 8a, 8b would have to be provided.

According to the invention, the two welding torches 4a, 4b are used sequentially in time, i.e., the first welding torch 4a or only the second welding torch 4b and then the other welding torch 4a, 4b in each case for a specific period of time. As a result, a metal structure 21 with a layered structure of various metal additives ZSa, ZSb can be produced. To produce a weld seam 10a, 10b, welding wires 7a, 7b are each exposed alternately in time to a welding power Ia, Ib and conveyed in the direction of base material G. When welding wires 7a, 7b come into contact with the base material G, an electric arc 11a, 11b is ignited between the respective welding torch 4a, 4b and the base material G, which fuses the respective welding wire 7a, 7b. In order to ignite the electric arc 11a, 11b (and keep it upright during the welding process), as already described, a second potential, for example ground potential, is applied to the base material G by means of ground lines 18a, 18b. The shape and size of the weld seams 10a, 10b is substantially determined by welding parameters such as, for example, additive or wire feed speed $v_{da}$, $v_{db}$ of the respective welding torch 4a, 4b, welding power Ia, Ib, welding speed $v_{sa}$, $v_{Sb}$ of the respective welding torch 4a, 4b relative to the base material G, etc.

This means that when the first welding torch 4a is activated, the first metal additive ZSa (which also forms the electrode in the GSMAW method) is supplied to the welding point S and is fused in the first electric arc 11a burning between the base material G (or an already welded weld seam) and the first additive ZSa. When the desired first weld seam 10a or the desired part of the metal structure 21 consisting of the material of the first additive ZSa has been completed, a switch is made to the second welding torch 4b, whereby the first welding torch 4a is deactivated (wire feed and welding power) so that no first electric arc 11a burns any longer. With the second welding torch 4b, the welding process is then continued, for example at the same point, in the same way as with the first welding torch 4a. The second metal additive ZSa (which also forms the electrode in the GSMAW method) of the second welding torch 4b is supplied to the welding point S and is fused in the second electric arc 11b burning between the base material G (or an already welded weld seam) and the second additive ZSa.

If a TIG process is provided for one or both welding torches 4a, 4b instead of the GSMAW process, the first and/or the second metal additive ZSa, ZSb are not used at the same time as consumable electrodes, but rather a non-consumable electrode (e.g., tungsten electrode) is used and the metal additives ZSa, ZSb are supplied separately to the welding point S, for example by means of suitable supply units. The first and/or second electric arcs 11a, 11b then burn between the (tungsten) electrode and the base material G (or an existing weld seam onto which it is welded).

Depending on the arrangement of the welding torches 4a, 4b relative to one another and relative to the base material G, an overlap region 23 can result between the weld seams 10a, 10b, as is symbolized by the hatched region in FIG. 2. In particular, a contact point spacing $I_B$ between contact points Ba, Bb of the welding wires 7a, 7b with the base material G and a welding wire angle β between the welding wires 7a, 7b are decisive for this purpose. The size of this overlap region 23 can thus be influenced, for example, by changing the contact point spacing $I_B$ and/or the welding wire angle β. For this purpose, the welding torches 4a, 4b could, for example, be moved relative to one another or a suitable adjustment device with appropriately suitable actuators could be provided in the respective welding torch 4a, 4b, for example to change the position of the respective welding wire 7a, 7b relative to the welding torch 4a, 4b, whereby the contact point distance $I_B$ and/or the welding wire angle β changes. In the simplest case, however, the contact points Ba, Bb coincide at a common contact point, the contact point spacing $I_B$ becoming zero in this case. The welding wires 7a, 7b are then supplied alternately to the same contact point (which can of course move relative to the base material during the welding method).

Of course, it would also be conceivable that the two welding torches 4a, 4b are not arranged next to one another in the transverse direction, as shown in FIG. 2, i.e. transverse to the welding direction, but are arranged one behind the other in the longitudinal direction, i.e. in the welding direction. The arrangement is substantially irrelevant for sequential welding with both welding torches 4a, 4b because, depending on the specified material composition of the metal structure 21, the desired welding torch 4a or 4b is guided to the point where welding is to be carried out. In particular, if a double welding torch 27 is provided, the two welding wires 7a, 7b can also run substantially parallel to one another and at a specific distance from one another, so that the contact point spacing $I_B$ between contact points Ba, Bb of the welding wires 7a, 7b with the base material G it is large enough that there is no overlap. The welding wires 7a, 7b are then alternately moved to the welding point in order to produce the metal structure 21, for example by suitable kinematics, as will be explained later.

In the welding arrangement 20, an optics 22 for generating a laser beam L is also provided, which in the example shown is arranged centrally between the two welding torches 4a, 4b in order to feed the laser beam L to the welding point S. The optics 22 can, for example, be controlled by an optics control unit 24 and can be controlled with the energy required to generate the laser beam L. In the example shown, a higher-level overall control unit 25 is also provided, which communicates with the control units 14a, 14b of the welding torches 4a, 4b, which are preferably arranged in the respective welding power source 2a, 2b. In this way, for example, a higher-level central user interface 26 could be provided, via which a user can operate the welding arrangement 20. The optics 22 can be designed to be movable or immovable relative to one or to both welding torches 4a, 4b. In the case of movable optics 22, the displacement of the laser beam L can take place, for example, by means of a suitable optics movement unit (not shown) which is controlled by the optics control unit 24 and moves the entire optics 22 relative to the welding torches 4a, 4b. The displacement of the laser beam L could, however, also take place, for example, by means of a suitable laser adjustment device 29 integrated in the optics, in which case the optics 22 itself need not necessarily be movable.

In the simplest case, however, the optics 22 and the welding torches are arranged immovably with respect to one another and can be moved together relative to the base material G, for example in the form of a double welding torch 27, as indicated in FIG. 2. The configuration of the welding arrangement 20 as a double welding torch 27 is advantageous because it creates a compact unit that can be spatially moved in order to produce the metal structure 21. The movement can be carried out, for example, by kinematics on which the double welding torch 27 is arranged, as will be explained later. The use of separate welding torches 4a, 4b, in turn, has the advantage that one is very flexible in the spatial movement of the welding torches 4a, 4b and relative to one another, and possibly also relative to the optics 22. However, the motion control in the case of separate welding torches 4a, 4b is more complex than with a double welding torch 27, since the welding torches 4a, 4b are preferably each moved by their own kinematics.

The higher-level central user interface 26 could then replace the user interfaces 17a, 17b for operating the two welding torches 4a, 4b or also be provided in addition to them. Via the higher-level central user interface 26, for example, certain predefined welding programs could be selected or specific welding programs could be transmitted to the higher-level overall control unit 25. For example, it would be conceivable to generate 3D CAD models externally and to read in the corresponding data via the higher-level central user interface 26 and to have them produced, preferably automatically, by the welding arrangement 20.

In order to produce a particularly three-dimensional metal structure 21, the welding torches 4a, 4b and the optics 22 can be moved relative to the base material G. This relative movement can be achieved in that the welding torches 4a, 4b and the optics 22 are arranged in a stationary manner and the base material G is moved relative thereto, for example by arranging the base material G on a movable base plate (not shown), which can preferably be moved in at least three orthogonal movement axes. For this purpose, the base plate could be driven, for example, by corresponding drive units such as linear motors or the like, which are controlled by a base plate control unit, which in turn could be connected, for example, to the higher-level overall control unit 25. Particularly preferably, in addition to the translatory movement in the movement axes, the base plate can also be moved in a rotatable manner about the respectively available movement axes, whereby metal structures 21 of greater complexity can be produced.

Figure 3:
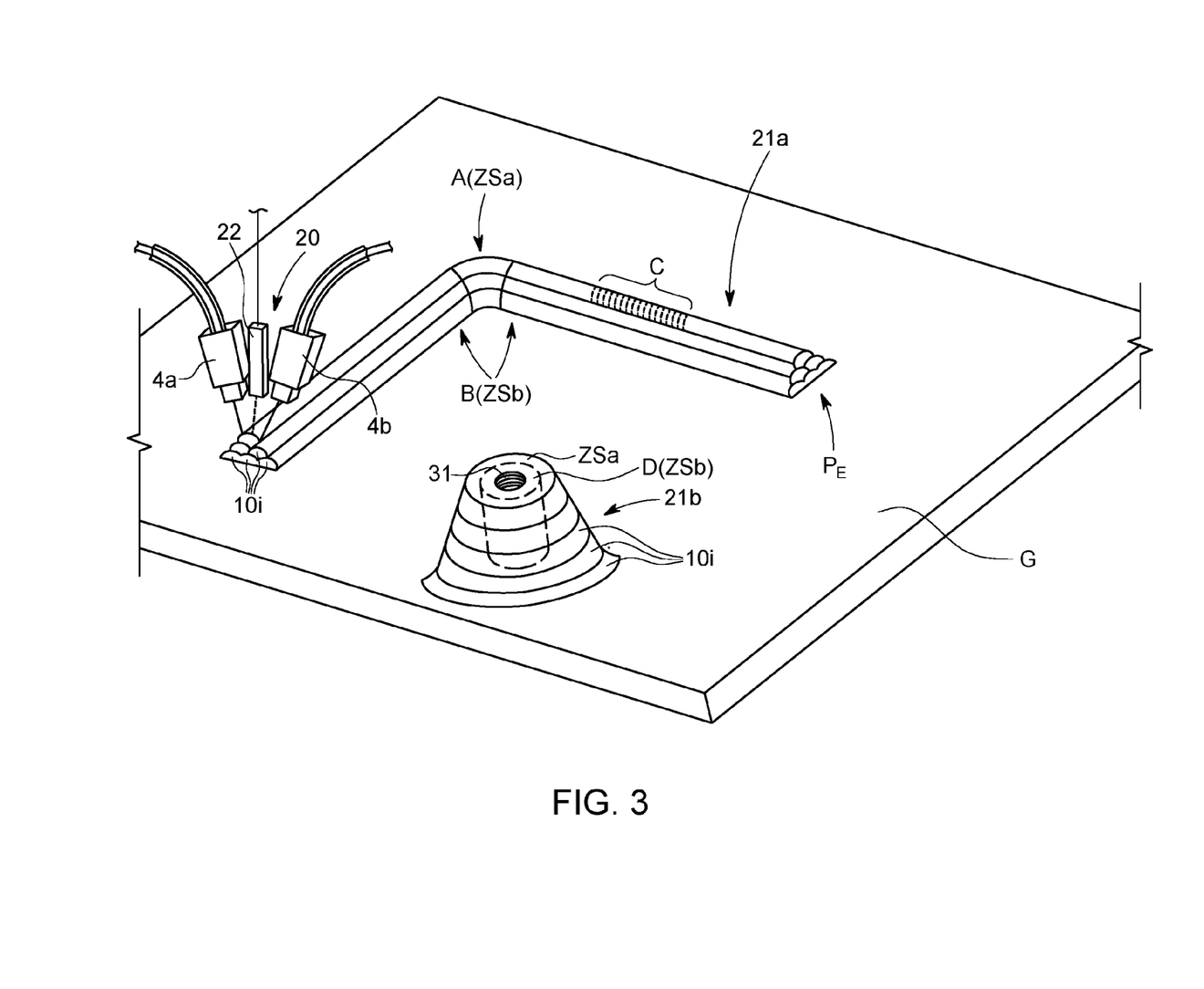
FIG. 3 shows a base material with two metal structures produced by means of the method according to the invention.

On the other hand, the relative movement can also be achieved in that the base material G is arranged in a stationary manner and the welding torches 4a, 4b and the optics 22 are moved relative thereto, as shown in FIG. 2 and FIG. 3. For this purpose, the welding torches 4a, 4b can be integrated, for example, as described in a common double welding torch 27, as is shown schematically in FIG. 2, and the double welding torch 27 could be moved in space. The optics 22 could then of course also be integrated in the double welding torch 27, as shown in FIG. 2, or also be provided as a separate unit. The spatial movement takes place again preferably at least translationally in three orthogonal movement axes and particularly preferably additionally rotationally about each movement axis. The double welding torch 27 can be arranged, for example, on kinematics (not shown) in FIG. 2, such as an industrial robot, and can be moved by the kinematics.

Of course, both the base material G and the welding torches 4a, 4b, and the optics 22 can also be moved. It would be conceivable, for example, that a translatory movement is carried out by the base material G or the base plate and a rotary movement by the welding torches 4a, 4b and the optics 22 (or, for example, the double welding torch 27 with integrated optics 22) or vice versa. It would also be conceivable, for example, that the optics 22 and one of the two welding torches 4a, 4b are combined in one unit and that the second welding torch 4a, 4b is provided as a separate unit.

To control the sequence of movements of the double welding torch 27 (or the separate welding torches 4a, 4b), a kinematics control unit 28 can be provided, for example, which is connected to the higher-level overall control unit 25. At this point, however, it should be pointed out that the welding arrangement 20 described with reference to the embodiment is of course only to be understood by way of example. The specific design is of course left to a person skilled in the art; in particular with regard to the movement control and the control of the welding processes themselves, in particular of welding parameters such as welding power, a person skilled in the art will fall back on known technologies available in the prior art.

However, the welding torches 4a, 4b and the optics 22 do not necessarily have to be integrated in a common double welding torch 27, but could also be designed as separate stationary or movable units, which in turn depends on the field of application and is at the discretion of a person skilled in the art. The positions of the welding torches 4a, 4b and the optics 22 relative to one another can also be fixed, i.e. they can be substantially unchangeable or changeable. The welding torches 4a, 4b and the optics 22 could, for example, be fixed (immovably) integrated in the double welding torch 27, as indicated in FIG. 2, in which case the position of the welding torches 4a, 4b and the optics 22 relative to one another is substantially predetermined by the structural design of the welding arrangement 20, in particular of the double welding torch 27. The welding torches 4a, 4b and the optics 22 could, however, also be movably arranged on the double welding torch 27, for example by means of suitable guide elements (not shown) and/or swivel joints. As a result, the position of the welding torches 4a, 4b and the optics 22 could be adjusted relative to one another, which can happen, for example, before the start of the production process of the metal structure 21. This can be advantageous, for example, if the boundary conditions change between two successive production processes, e.g. because the geometry of the metal structures 21 differ, other metal additives ZSa, ZSb are used, etc. or this can improve accessibility, e.g. for servicing purposes. During the production process of the metal structure 21, the position of the welding torches 4a, 4b and the optics 22 relative to one another would, however, be constant in this case and would therefore not change.

Of course, it would also be conceivable that the welding torches 4a, 4b and the optics 22 are movably arranged on the double welding torch 27 and, for example, their position relative to one another can be changed by means of suitable drive devices (not shown) during the production process of the metal structure 21. For example, the double welding torch 27 could only be movable in a translatory manner and the welding torches 4a, 4b and the optics 22 could be rotationally movable on the double welding torch 27. In this case, the movement of the welding torches 4a, 4b and the optics 22 could be controlled, for example, in that the kinematics control unit 28 controls the drive devices.

It can be seen that a large number of combinations are possible as to how the sequence of movements of the production process of the metal structure 21 can be controlled. The welding parameters, such as the additive or wire feed speeds $v_{da}$, $v_{db}$, the welding powers $I_a$, $I_b$ are preferably adapted to the specified sequence of movements for generating a specific geometry of the metal structure 21, in particular to the relative speed of the welding torches 4a, 4b relative to the base material G.

The laser beam L generated by the optics 22 could, for example, be moved relative to the first and second welding torches 4a, 4b (or vice versa), as a result of which the laser beam L can take on a plurality of tasks in the production of the metal structure 21. For example, an electric arc 11a, 11b can be guided by means of the laser beam L, as will be explained in detail below, as a result of which the positional accuracy of the weld seams 10a, 10b and consequently of the metal structure 21 can be improved. In this way, for example, smaller dimensional tolerances can be maintained. However, the laser beam L can also be used analogously to the applicant's known hybrid welding method to support the actual GSMAW process by adding additional heat to the electric arc 11a, 11b of the GSMAW process. The laser beam L could, however, also be used for laser welding, in which case the heat input takes place only through the energy of the laser beam L without the welding torches 4a, 4b being active, i.e. without an electric arc 11a, 11b. Furthermore, as shown in FIG. 2, the laser beam L can be substantially centrally located between two weld seams welded next to one another, in this case the two weld seams 10a, 10b, whereby joining errors in the structure between the two weld seams 10a, 10b due to the heat input supplied by the laser beam L can be reduced, preferably avoided.

It would also be conceivable that the laser beam L is used for laser cutting the metal structure 21 and/or the base material G, the metal structure 21 and/or the base material G being severed by the laser beam. As a result, it would be conceivable, for example, that a finished metal structure 21 is cut into a plurality of individual elements or that a finished metal structure 21 is cut out of the base material G, for example precisely along an outer circumference of the metal structure 21 or according to a specific geometric shape. According to a further application, the laser beam L can also be used to harden and/or temper the weld seams 10a, 10b and/or the finished metal structure 21 on the surface, provided that the metal additive ZSa, ZSb is suitable for this purpose, which, substantially depends on the carbon content of the metal additives ZSa, ZSb. This can also take place, for example, when the production process of the metal structure 21 has already been completed, i.e. after the actual welding process and consequently without activated welding torches 4a, 4b. The laser beam L is then guided over the desired regions of the metal structure 21 that are to be hardened (or tempered).

Hardening is a heat treatment of preferably steel, with rapid heating followed by rapid cooling of the region to be hardened. This changes the crystalline structure of the steel, which increases the surface hardness. Tempering is a slow heating that follows the rapid cooling in the course of the hardening process. Tempering substantially reduces the brittleness of the steel caused by the rapid cooling. The combination of hardening and tempering is called quenching. Hardening and tempering processes are known in the prior art, which is why they will not be discussed in more detail here. In the context of the invention, the rapid cooling phase required for the hardening process can be achieved, for example, by introducing a cooling medium by means of a cooling medium supply unit (not shown). The cooling medium supply unit could, for example, again be controlled by the higher-level overall control unit 25. In the example shown, it would be conceivable that the cooling medium supply unit is arranged, for example, on the support element 27 or else as a separate element.

To guide an electric arc 11a, 11b, the laser beam L is focused in the region of the welding point S, preferably in the region of the respective contact point Ba, Bb of the welding wires 7a, 7b. The laser L thereby produces a heat input in the base material G independently of the electric arc 11a, 11b, as a result of which the base material G is melted at least on the surface. The electric arc 11a, 11b thus burns between the region of the material of the base material G melted by the laser beam L (or an already produced weld seam 10a, 10b of the metal structure 21 if welding is carried out in layers) and the welding wire 7a, 7b. This guidance is particularly advantageous when igniting the electric arc 11a, 11b because, in contrast to conventional GSMAW without laser support, it results in a very precise initial positioning of the electric arc 11a, 11b, and consequently the weld seam 10a, 10b at the beginning of the welding process can take place since the electric arc 11a, 11b is substantially attracted by the laser beam.

The guidance of the electric arc 11a, 11b is also advantageous during welding, i.e. after the electric arc 11a, 11b has already been ignited, because this results in a very stable electric arc 11a, 11b with only slight radial fluctuations around the welding point S during welding (in the welding direction and across it). The guidance of the laser beam L or, in particular, the attraction of the electric arc 11a, 11b by the laser beam L takes place substantially due to the strong local heating of the base material G (or the material of an already existing weld seam), whereby an ionized laser plasma is produced through which the electric arc is attracted. In order not to be able to guide just one of the electric arcs 11a, 11b, however, it is advantageous if the laser beam L can be moved relative to the welding torches 4a, 4b during the welding process. In this way, for example, when welding the first and second welding torches 4a, 4b sequentially, the laser beam L can be guided to the welding point S for guiding the burning first or second electric arc 11a, 11b in each case.

As described, depending on the positioning and angle of the welding torches 4a, 4b, in particular the welding wires 7a, 7b relative to one another and relative to the base material G, there may be an overlap region 23 of the first and second weld seam 10a, 10b, as shown in FIG. 2. If, for example, welding is carried out with both welding torches 4a, 4b at the same time, the overlap region 23 of the two weld seams 10a, 10b will preferably be relatively small (depending on the contact point spacing $I_B$) so that the first and second electric arcs 11a, 11b do not negatively influence one another. In chronologically sequential welding according to the invention, the contact points $B_a$, $B_b$ can also coincide, for example, in a common contact point B, since there is no mutual influence or contact between the welding wires 7a, 7b because only one welding torch 4a, 4b is ever active. As a result, by using different materials for the first and second additives ZSa, ZSb, substantially a single continuous weld seam 10 can be produced which (depending on the time that each welding torch 4a, 4b is active and the welding speed $v_{sa}$, $v_{sb}$ relative to the base material G) has a different material composition in portions, as will be explained in detail below with reference to FIG. 3.

This can be particularly advantageous when individual regions of the metal structure 21 have different requirements with regard to strength. In FIG. 2, the laser beam L is shown in such a way that it is focused in a region centrally between the two weld seams 10a, 10b, for example in order to avoid joining errors between the two weld seams 10a, 10b, as described above. If the laser beam L is movable relative to the welding torches 4a, 4b, the laser beam L can be used, for example, to guide the first electric arc 11a or to guide the second electric arc 11b, as shown in FIG. 2 with the aid of the laser beams $L_a$, $L_b$. In the example shown, the laser beam L can thus be moved around the welding point S in a substantially conical beam region with a beam angle α. This is of course only an example and also depends on the specific design of the optics 22. The mobility of the laser beam L can, as described, be achieved by changing a position and/or an angle of the entire optics 22, for example by controlling the optics movement unit, or a suitable laser adjustment device 29 could be provided in the optics 22 with which the laser beam L can be moved, for example in the form of a suitable adjustable mirror or one or more suitable lenses.

Of course, a focus of the laser beam L can also be changed by means of the optics 22, for example in order to change the region of the heat input, in particular a region and a depth of the heat input produced by the laser beam L. For the displacement of the focus of the laser beam L, a suitable focusing device (not shown) is preferably provided in the optics 22, for example in the form of lenses that can be moved relative to one another.

The laser beam L could for example be used analogously to the hybrid welding process to support the GSMAW process of the welding torches 4a, 4b, the focus of the laser beam L preferably being selected so that a narrow and deep heat input takes place (small area, large depth). For other purposes, such as hardening, tempering, or in order to avoid joining errors for the central position of the laser beam L shown in FIG. 2 in the region between the weld seams 10a, 10b, it can be advantageous if the focus of the laser beam L is chosen so that a comparatively broader and flatter heat input results in order not to melt the material or to melt it only to a small extent. The variability of the focus setting naturally depends in turn on the specific design of the optics 22 or the focusing device.

It would also be conceivable that the laser beam L is split into at least a first split laser beam $L_{Ta}$ and a second split laser beam $L_{Tb}$, for example by a laser splitting device 30 provided in the optics 22, for example an optical prism, the first split laser beam $L_{Ta}$ being supplied to the welding point S, preferably to guide the first or second electric arc 11a, 11b, and the second split laser beam $L_{Tb}$ being supplied to the welding point S, for example to avoid joining errors. As a result, the production process for the metal structure can be made even more flexible. The specific configuration of the laser splitting device 30 is irrelevant for the invention; a suitable lens or mirror, etc. would be conceivable, for example.

The laser splitting device 30 and also the focusing device could be provided as separate units in the optics 22, but could also, for example, be designed integrally with the laser adjustment device 29. Preferably, of course, the split laser beams $L_{Tb}$, $L_{Ta}$ can in turn be moved, so that two substantially conical beam regions (not shown) each having a spray angle $\alpha_{Ta}$, $\alpha_{Tb}$ result again analogously for example in the substantially cone-shaped beam region of the laser beam L shown in FIG. 2. The respective focus of the split laser beams $L_{Tb}$, $L_{Ta}$ is preferably also variable, for example by means of separate split laser beam focusing devices. The laser adjustment device 29, the (split laser beam) focusing device and the laser splitting device 30 are preferably controlled by the optics control unit 24, which in turn is controlled, for example, by the higher-level overall control unit 25. Analogously to the laser beam L, the laser beams $L_{Tb}$, $L_{Ta}$ can in turn fulfill the functions already described, for example used for laser welding, laser hybrid welding, laser cutting, hardening, etc., which makes the method even more flexible.

In FIG. 3, a base material G is shown in the form of a flat plate, on which a first metal structure 21a and a second metal structure 21b are welded. The welding arrangement 20 can be designed as described with reference to FIG. 2 and is only shown schematically in this case. The welding arrangement 20 could, for example, as shown in FIG. 2, have a double welding torch 27 (not shown) that is moved, for example, by suitable kinematics. However, the first welding torch 4a, the second welding torch 4b, and the optics 22 could also be moved spatially separately from one another, for example each arranged on their own kinematics.

The first metal structure 21a is substantially of an L-shaped design in this case and is constructed of a plurality, in particular six, weld seams 10i in layers. In order to produce the illustrated first metal structure 21a, three weld seams 10i are preferably first welded next to one another onto the base material G, in that the illustrated welding arrangement 20 follows the substantially L-shaped profile. As already described, the movement is preferably carried out by a common (or a plurality of independent) kinematics—such as a welding robot, for example—which is controlled, for example, by the higher-level overall control unit 25. The profile, which is L-shaped in this case, can, for example, be specified via the higher-level user interface 26, for example in the form of a CAD model. The three juxtaposed weld seams 10i of the lowest row of the first metal structure 21a can be produced, for example, in that first the three lowest weld seams 10i are welded one after the other from a starting point $P_A$ to an end point $P_E$ along the L-shaped profile (each offset in the transverse direction), then the middle weld seams 10i are in turn welded successively in time from the starting point $P_A$ to the end point $P_E$ and finally the uppermost weld seam 10i is welded in a subsequent work step from the starting point $P_A$ to the end point $P_E$.

To shorten the processing time, it can be advantageous if, for example, after the completion of the first weld seam 10i of the bottom row, the welding arrangement 20 is not moved back to the starting point $P_A$, but that the second (e.g., the middle) weld seam 10i of the bottom row is welded in reversed direction from the end point $P_E$ to the starting point $P_A$ along the L-shaped profile. The third (e.g., external) weld seam 10i can then be welded again from the starting point $P_A$ to the end point $P_E$, etc. In this case, the welding process could also take place continuously, i.e. without discontinuation between the completion of a weld seam 10i and the start of a new weld seam 10i. If a longer cooling phase is required, the welding process of the weld seams 10i can also be carried out from the starting point $P_A$ to the end point $P_E$, the welding arrangement 20 being moved again from the end point $P_E$ back to the starting point $P_A$ after welding.

In the welding arrangement 20 according to the invention in the example shown, two welding torches 4a, 4b having different metal additives ZSa, ZSb are provided. For example, a first metal additive ZSa can be used in the first welding torch 4a which, compared to the second additive ZSb of the second welding torch 4b, has a higher (or lower) mechanical strength. In this way, for example, a first (middle) portion A of the first metal structure 21a can be produced, which consists of the material of the first metal additive ZSa with specific mechanical strength properties. In the example shown, the remaining second portions B of the first metal structure 21a consist of the material of the second metal additive ZSb with different mechanical strength properties than the first portion A. It can be seen that a very high level of flexibility with regard to the material composition is achieved in the production of a metal structure 21.

The production of the illustrated metal structure 21a can take place, for example, in that first the first weld seam 10i of the bottom row with the second metal additive ZSb is continuously welded with the first welding torch 4b, starting from the starting point $P_A$ up to the beginning of the first portion A, whereby the movement control is preferably carried out by the kinematics control unit 28 or the overall control unit 25. At the beginning of the first portion A, there is a switchover from the second welding torch 4b to the first welding torch 4a, with which the weld seam 10i, consisting of the first additive ZSa, is continued until the end of the first portion A. This is followed by a switchover from the first welding torch 4a to the second welding torch 4b and final welding of the first weld seam 10i up to the end point $P_E$. Then the second, e.g. the middle weld seam of the bottom row is produced in an analogous manner, etc. To switch between the welding torches 4a, 4b, the welding arrangement 20 is briefly stopped, one welding torch 4a or 4b being deactivated and the other welding torch 4a or 4b being activated. Of course, the wire feed, the energy supply, etc. are stopped or started as in a conventional GSMAW process, so that only one electric arc 11a or 11b of the corresponding welding torch 4a or 4b that is currently being used is burning. In this way, any three-dimensional geometries can of course be produced, which can also be significantly more complex than the L-shaped profile shown. It would also be conceivable, for example, if the space conditions allow, that a third welding torch 4c is provided with a further third metal additive ZSc, whereby the material composition of the metal structure 21 can be matched even better to specific requirements.

In the third portion C of the first metal structure 21a, the surface was hardened by means of the laser beam L, as has already been described with reference to FIG. 2. For this purpose, for example, the optics 22 can be moved along the weld seam 10i in the desired portion, in this case in the third portion C, after the GSMAW process has ended, i.e. after the uppermost weld seam 10i has been welded, and the laser beam L produces a heat input in the uppermost weld seam 10i, whereby the metal structure of the uppermost weld seam 10i changes. Preferably, the zone heated by the laser beam L is rapidly cooled again shortly after the heat input has taken place in order to end the hardening process, for example by supplying a suitable cooling medium by means of a cooling medium supply unit (not shown). If necessary, tempering can then be carried out again as described in order to reduce the brittleness of the hardened third portion C.

If the laser beam L is designed to be movable, for example by means of movable optics 22, the hardening process can be further improved because the laser beam L can be better adapted to the geometry of the metal structure 21. For example, in the example shown, the laser beam L could be moved better along the substantially semi-cylindrical surface of the uppermost weld seam 10i, which allows for better scanning of the entire surface, as a result of which a very uniform hardening depth can be achieved over the entire surface of the uppermost weld seam 10i. The first metal structure 21a of the example shown has a relatively simple geometry; the more complex the geometry of a metal structure, the greater the advantages due to the welding arrangement 20 according to the invention, in particular by the degrees of freedom of movement of the welding torches 4a, 4b (to 4i) and the optics 22, in particular of the laser beam L relative to one another and relative to the welding point S.

Another advantageous application of the welding arrangement 20 is shown in FIG. 3 with the aid of the second metal structure 21b. The second metal structure 21b substantially has the shape of a truncated cone and is constructed from a plurality of layers of weld seams 10i arranged one above the other. For example, the layers can each be designed as a spiral weld seam 10i or in the form of a plurality of weld seams 10i in the form of concentric circles. In principle, however, the sequence of movements can be freely selected and is at the discretion of the responsible user.

The second metal structure 21b is designed in this case such that a second metal additive ZSb is provided in a central, substantially cylindrical region D (dashed in FIG. 3), which additive has a higher mechanical strength than the rest of the material from the first metal additive ZSa surrounding the region D. In the central region D of higher strength, a bore 31 with a thread is arranged, into which a screw (not shown) can be screwed, for example for fastening any component. Preferably, the entire volume including the region D of higher strength is welded first and the bore is then made. The production of the second metal structure 21b can in turn take place as was explained with reference to the first metal structure 21a. For example, the first welding torch 4a could be used to weld continuously from the outside to the inside in a spiral shape on the base material G in order to produce the radially outer region of the lowermost layer of the second metal structure 21b. It would then be possible to make a switch from the first welding torch 4a to the second welding torch 4b in order to weld the central region, which consists of the second metal additive ZSb. However, concentric circles that are becoming smaller in each case could also be welded from the outside to the inside first with the first welding torch 4a and then in the central region with the second welding torch 4b (or vice versa). The process is then repeated in layers with smaller circles until the desired shape of the second metal structure 21b is completed. In the uppermost layer of the illustrated second metal structure 21b, for example, only a relatively narrow edge region is produced from the material of the first additive ZSa, the central, substantially cylindrical region D consisting of the material of the second additive ZSb, a high-strength material preferably being selected to provide sufficient strength for the thread shown.

In addition, after completion of the welding method or the production of the second metal structure 21b, further mechanical processing could of course also take place, for example milling, in order to obtain a flat surface. In particular when relatively high loads act on the screw, it may be necessary to provide a corresponding thread with a strength suitable for the load. Since materials of higher strength are generally more expensive than materials of lower strength, it is advantageous, that the volume of the second metal structure 21b is not entirely produced of the high-strength material of the second metal additive ZSb, but rather only a selected region D, as shown. There is a very good material connection between the central region D and the surrounding material due to the welding process, which is advantageous compared to other types of connection, such as a press connection or other types of mechanical connection. As a result, metal structures 21 can be produced with regions that are locally adapted to specific mechanical boundary conditions, whereby, for example, production costs can be saved with constant quality or the quality can be increased with constant production costs. For example, if the second metal structure 21b should be produced as a separate component, the laser beam L (or the split laser beams $L_{Tb}$, $L_{Ta}$) could be used for laser cutting and cut out the second metal structure 21b from the base material G, e.g. along the outer circumference of the lowermost first weld seam 10i.

The described embodiments are of course only to be understood by way of example and are not conclusive. The concrete structural implementation of the welding arrangement 20 with regard to the number, arrangement, and degrees of freedom of the welding torches 4a, 4b (up to 4i) and the optics 22, the choice of the shielding gases SGa, SGb and the additives ZSa, ZSb, etc. is of course at the discretion of a person skilled in the art.

However, the method is not restricted to the example described with reference to the figures. For one or both welding torches 4a, 4b, instead of the GSMAW process, for example, the known TIG welding process could also be used. In this case, the welding wire 7a, 7b would not be used at the same time as a metal additive ZSa, ZSb and a fusing electrode, but a high-temperature resistant, non-consumable electrode would be provided on the welding torch 4a, 4b, e.g. a tungsten electrode. The electric arc 11a, 11b would then be ignited between the tungsten electrode and the base material G and the metal additive ZSa, ZSb would be supplied separately to the welding point S, for example manually, but preferably by means of a suitable first and/or second supply unit. Since the TIG welding method is known in principle, it will not be discussed in detail here. Of course, it would also be conceivable for the welding arrangement 20 to be provided for a combination of a GSMAW process and a TIG welding process, with the first welding torch 4a being designed as a GSMAW torch and the second welding torch 4b being designed as a TIG welding torch, for example. This means that the advantages of both welding methods can be used.

The invention claimed is:

1. A method for automated production of at least one three-dimensional metal structure on a metal base material, comprising:
when a first welding torch is activated, supplying a first metal additive to a welding point on the metal base material the first metal additive being fused at the welding point in a first part of a welding process to produce a first weld seam via at least by a first electric arc produced between a first electrode of the first welding torch and the metal base material, whereby the first weld seam produces a first portion of the three-dimensional metal structure consisting of a material of the first metal additive;
supplying a laser beam to the welding point; and
supplying, via a second welding torch, a second metal additive to the welding point, the second metal additive being fused at the welding point in a second part of the welding process to produce a second weld seam at least by a second electric arc produced between a second electrode of the second welding torch and the metal base material, whereby the second weld seam produces a second portion of the three-dimensional metal structure consisting of a material of the second metal additive,
wherein the first metal additive and the second metal additive are different materials, and
wherein the first metal additive and the second metal additive are supplied to the welding point sequentially in time by switching from the first welding torch, which is deactivated so that no electric arc burns any longer when the first weld seam or part of the three-dimensional metal structure consisting of the material of the first additive has been completed, to the second welding torch, so that the second part of the welding process is continued from the first part of the welding process and the first portion of the three-dimensional metal structure and the second portion of the three-dimensional metal structure are fused in a region of the welding point to form the three-dimensional metal structure.

2. The method according to claim 1, wherein welding wires of same or different dimensions are used as the first metal additive and as the second metal additive.

3. The method according to claim 1, wherein at least one of:
the first metal additive is supplied to the welding point at a predetermined first wire feed speed, which is set between 2 m/min and 25 m/min, or
the second metal additive is supplied to the welding point at a predetermined second wire feed speed, which is set between 2 m/min and 25 m/min.

4. The method according to claim 1, wherein at least one of:
the first metal additive, the second metal additive, and the laser beam are moved together relative to the base material,
the base material is moved relative to the first metal additive, the second metal additive, and the laser beam,
the laser beam and at least one of the first metal additive or the second metal additive are moved relative to each other.

5. The method according to claim 3, wherein at least one of:
selecting the first wire feed speed during movement of the first metal additive relative to the base material depending on a first welding speed of the first metal additive relative to the base material, or
selecting the second wire feed speed during movement of the second metal additive relative to the base material depending on a second welding speed of the second metal additive relative to the base material.

6. The method according to claim 1, wherein heat is supplied to the metal structure by the laser beam in order to change a microstructure of the three-dimensional metal structure.

7. The method according to claim 1, wherein:
the laser beam is used for laser welding, and at least one of the first metal additive or the second metal additive is fused only by the laser beam at the welding point.

8. The method according to claim 1, wherein at least one of:
the first metal additive forms the first electrode and is fused at the welding point, or
the second metal additive forms the second electrode and is fused at the welding point.

9. The method according to claim 1, wherein the laser beam is used to guide at least one of the first electric arc or the second electric arc.

10. The method according to claim 6, wherein the heat is supplied to the three-dimensional metal structure by the at least one laser beam results to at least one of:
avoid joining errors between the first portion of the three-dimensional metal structure and the second portion of the three-dimensional structure, or
harden and/or temper a surface of at least one the first portion of the three-dimensional metal structure, the second portion of the three-dimensional metal structure.

11. The method according to claim 1, wherein the laser beam is used for laser hybrid welding, and at least one of the first metal additive or the second metal additive is fused by the laser beam and a respective one of the first electric arc or the second electric arc at the welding point.

12. The method according to claim 1, wherein at least one of:
a non-consumable first electrode is provided as the first electrode, and the first metal additive is supplied to the welding point and is fused at the welding point, or
a non-melting second electrode is provided as the second electrode, and the second metal additive is supplied to the welding point and is fused at the welding point.

13. The method according to claim 12, wherein at least one of: a first tungsten electrode as the non-consumable first electrode is provided as the first electrode, the first metal additive is supplied to the welding point by a first supply unit, a second tungsten electrode as the non-melting second electrode is provided as the second electrode or the second metal additive is supplied to the welding point by a second supply unit.

14. A welding arrangement for producing metal structures on a metal base material, comprising:
- optics for generating a laser beam;
- a first welding torch with a first electrode for generating a first electric arc between the first electrode and the base material for fusing a first metal additive in order to produce a first weld seam on the base material, which is a first portion of the metal structure consisting of a material of the first metal additive;
- a first supply device is arranged to supply the first metal additive to a welding point;
- at least one controller for controlling the welding arrangement;
- at least one second welding torch with a second electrode for generating a second electric arc between the second electrode and the base material is arranged in the welding arrangement in order to fuse a second metal additive in order to produce a second weld seam on the base material, which is a second portion of the metal structure consisting of the material of the second metal additive; and
- a second supply device is arranged to supply the second metal additive to the welding point,
- wherein the first metal additive and the second metal additive are different materials,
- wherein the controller is configured to control the first and second supply device, in order to supply the first metal additive and the second metal additive to the welding point sequentially in time, wherein the controller is configured to make a switch from the first welding torch, when the first weld seam or part of the metal structure consisting of the material of the first additive has been completed, to the second welding torch, whereby the first welding torch is deactivated so that no first electric arc burns any longer and the second welding torch is activated to produce the second weld seam, in order to fuse the first metal additive and the second metal additive in a respective sequentially burning one of the first and second electric arcs, in order to form the three-dimensional metal structure, and
- wherein the first welding torch and the second welding torch are designed as separate units or as a double welding torch.

15. The welding arrangement according to claim 14, wherein the first metal additive and the second metal additive are welding wires of the same or different dimensions.

16. The welding arrangement according to claim 14, wherein the first supply device is arranged to feed the first metal additive at a predetermined first wire feed speed to the welding point, and
- wherein the second supply device is arranged to feed the second metal additive at a predetermined second wire feed speed to the welding point,
- wherein the predetermined first wire feed speed and the predetermined second wire feed speed are same or different speeds.

17. The welding arrangement according to claim 14, wherein the first welding torch and the second welding torch are movable relative to one another.

18. The welding arrangement according to claim 14, wherein one of:
- the laser beam of the optics is movable relative at least to the first or second welding torch or to double welding torch or
- at least one of the first or second welding torch or the double welding torch is movable relative to the laser beam, and
- wherein the optics are movable to move the laser beam, or include a laser adjustment device to move the laser beam.

19. The welding arrangement according to claim 14, wherein at least one of:
- at least one of the first electrode or the second electrode is formed as a consumable electrode in the form of a metal additive or
- at least one of the first electrode or the second electrode is formed as a non-consumable electrode.

20. The welding arrangement according to claim 15, wherein the welding wires having a round cross section and a diameter between 0.1 and 5 millimeters.

21. The welding arrangement according to claim 16, wherein;
- at least one of the first wire feed speed or the second wire feed speed is set depending on a first welding speed or second welding speed of the first or second welding torch, respectively, or
- at least one of the first wire feed speed or the second wire feed speed is set depending on a welding speed of the double welding torch relative to the base material.

22. A method of producing a three dimensional metal structure on a metal base material with the welding arrangement according to claim 14, wherein the first metal additive and the second metal additive are supplied sequentially in time by the first welding torch and second welding torch or by the double welding torch at a welding point on the metal base material to produce the three-dimensional metal structure in layers from at least a plurality of first and/or second weld seams.

* * * * *